US012812011B2

(12) United States Patent
Baldini et al.

(10) Patent No.: US 12,812,011 B2
(45) Date of Patent: Nov. 24, 2026

(54) NETWORK FUNCTION FOR USE IN HANDLING THE CREATION OF APPLICATIONS FOR SUBSCRIBERS

(71) Applicant: Telefonaktiebolaget LM Ericsson (publ), Stockholm (SE)

(72) Inventors: Luca Baldini, Pagani (IT); Gaetano Patria, Pagani (IT); Paolo Debenedetti, Genoa (IT); Davide Massino, Genoa (IT); Daniele Gaito, Pagani (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 18/853,770

(22) PCT Filed: Apr. 4, 2022

(86) PCT No.: PCT/EP2022/058826
§ 371 (c)(1),
(2) Date: Oct. 3, 2024

(87) PCT Pub. No.: WO2023/193872
PCT Pub. Date: Oct. 12, 2023

(65) Prior Publication Data

US 2025/0233923 A1 Jul. 17, 2025

(51) Int. Cl.
*H04L 67/306* (2022.01)
*H04L 9/40* (2022.01)
(Continued)

(52) U.S. Cl.
CPC ........ *H04L 67/306* (2013.01); *H04L 63/0853* (2013.01); *H04L 63/102* (2013.01);
(Continued)

(58) Field of Classification Search
CPC . H04L 63/0853; H04L 63/102; H04L 63/168; H04L 67/306; H04L 67/50; H04W 12/08; H04W 12/088; H04W 12/72
See application file for complete search history.

(56) References Cited

U.S. PATENT DOCUMENTS 9,148,308 B2 * 9/2015 Qiu .......................... H04L 12/66
9,489,250 B2 * 11/2016 Raja Rao .............. G06F 11/079
(Continued)

OTHER PUBLICATIONS

International Search Report and Written Opinion issued in International Application No. PCT/EP2022/058826 dated Nov. 28, 2022 (11 pages).
(Continued)

*Primary Examiner* — Thomas J Dailey
(74) *Attorney, Agent, or Firm* — Rothwell, Pigg, Ernst & Manbeck, P.C.

(57) ABSTRACT

A method (800) performed by an application handling function, AHF (122), of a mobile core network (106). The method includes receiving a query message transmitted by an application server function, ASF (190), the query message comprising a first subscriber identifier for identifying a first subscriber. The method also includes using the first subscriber identifier to obtain a first UE profile associated with the first subscriber identifier. The method further includes transmitting towards the ASF (190) a query response message responsive to the query message, the query response message comprising the first UE profile. The first UE profile comprises i) a first UE identifier, ID, for a first UE of a first UE type and ii) a first command ID that identifies a first command that the ASF (190) is authorized to invoke with respect to the first UE in connection with providing a service to the first subscriber.

20 Claims, 8 Drawing Sheets

(51) Int. Cl.
*H04L 67/50* (2022.01)
*H04W 12/08* (2021.01)
*H04W 12/088* (2021.01)
*H04W 12/72* (2021.01)

(52) U.S. Cl.
CPC ............ *H04L 67/50* (2022.05); *H04W 12/08* (2013.01); *H04L 63/168* (2013.01); *H04W 12/088* (2021.01); *H04W 12/72* (2021.01)

(56) References Cited

U.S. PATENT DOCUMENTS

| | | | | |
|---|---|---|---|---|
| 2016/0241641 | A1 | 8/2016 | Mazor | |
| 2017/0111373 | A1 | 4/2017 | Morton et al. | |
| 2020/0322884 | A1* | 10/2020 | Di Girolamo | H04W 12/06 |
| 2021/0368342 | A1* | 11/2021 | Zhu | H04W 12/71 |

OTHER PUBLICATIONS

Atlam, H. F. et al., “Internet of Things: Sate-of-the-art, Challenges, Applications, and Open Issues”, International Journal of Intelligent Computing Research (IJICR), vol. 9, Issue 3, Sep. 2018 (11 pages).
Singh, A. K. et al., “Software and Hardware Security of IoT”, IEEE 2021 (5 pages).
Microsoft, “What is Azure IoT Cemtral?”, The Wayback Macine—https://web.archive.org/web/20220401031223/https://docs.microsoft.com, Article Feb. 21, 2022 (6 pages).
OMA SpecWorks, “Lightweight Machine to Machine Technical Specification: Core”, Open Mobile Alliance, Approved Version: 1.2—Nov. 10, 2020 (150 pages).
Geekflare, “12 Open Source Internet of Things (IoT) Platforms and Tools”, by Geekflare Editorial on Aug. 21, 2020 (14 pages).
Koster, M. et al., “Semantic Definition Format (SDF) for Data and Interactions of Things”, ASDF, Feb. 28, 2022 (49 pages).

* cited by examiner

NETWORK FUNCTION FOR USE IN HANDLING THE CREATION OF APPLICATIONS FOR SUBSCRIBERS

CROSS REFERENCE TO RELATED APPLICATIONS

This application is a 35 U.S.C. § 371 National Stage of International Patent Application No. PCT/EP2022/058826, filed 2022 Apr. 4.

TECHNICAL FIELD

Disclosed are embodiments related to a network function (NF) that handles the creation of applications for subscribers.

BACKGROUND

The sixth generation of wireless technology ("6G") follows up on the 4G and 5G technology, building on the revamped infrastructure and advanced capacity currently being established on millimeter-wave 5G networks. Using higher-frequency radio bands, 6G will give networks much faster speeds and lower latency, and, thus, the ability to support sophisticated mobile devices and systems.

New applications prospects, like the Internet of Senses (IoS), which merges communication with sensing capabilities, offer new application horizons to connectivity systems. Because of the multiplicity of use cases potentially generating massive amounts of data, 6G systems will also have to natively incorporate analytics and intelligence capabilities, in view of enabling real time decision making on high data volumes potentially originating from a vast number of sensors. Connected intelligence is hence expected to become a distinguishing feature of 6G systems, both at the service of the 6G platform performance and efficiency and at the service of the vertical use cases running on top of it.

At the same time, the large volumes of data that will have to be processed by a 6G system call for ultrahigh levels of security whilst respecting trust and data privacy. The network envisioned with 6G ecosystem will enable the Internet of Senses (IoS) providing the proper level of cyber security, in terms of data integrity and trustworthiness of the infrastructure and would be compliant with regulatory specifications.

6G devices will be provided not only of the electronic Senses technology, but also will be able to remotely reproduce the senses, for example during a phone call it will be possible not only to see who you are talking to but also to share smells.

6G devices will be available everywhere for different uses and in different environments such as personal wearable devices, devices for smart-home, automotive devices on cars, smart city devices and so on. We can envisage several groups of devices grouped in vertical sectors such as smart city, personal health, automotive, smart-home.

Information on the State of the Art of IoT and the IoT World Forum Reference Model can be found in Atlam, H., et. al., "Internet of Things: State-of-the-art, Challenges, Applications, and Open issues," International Journal of Intelligent Computing Research (IJICR), vol. 9, issue 3, September 2019; information on the software, hardware, and security of IoT can be found in Singh, A. K., et. al., "Software and Hardware Security of IoT," 2021 IEEE International IOT, Electronics and Mechatronics Conference, 21-24 Apr. 2021.

SUMMARY

Certain challenges presently exist. For instance, it is expected that a vast number of IoT and IoS devices of many different types and from many different manufactures will be connected to a mobile network operator's (MNO's) network (e.g., a 5G or 6G MNO network), and it is also expected that at least some of these devices, if not many, cannot be easily integrated into the network due to their proprietary implementation and their dedicated cloud applications. Moreover, IoT and IoS devices are typically grouped in homogeneous groups per vertical sectors. For instance, there are IoT devices for personal health and wellness, devices for implementing smart cities, devices for use in automobiles, smart home devices, devices for industry, etc. Each group of devices is typically fully dedicated to a specific application handling its context and creating silos where devices and applications are self-contained to perform their task in the specific domain. Furthermore, the vendor of the IoT devices is also the vendor of the software (SW) application handling the device, hence another application is not easily able to use the same UE or it is not allowed at all. In such context it will be difficult to create smart applications making use of diverse types of devices in different contexts and from different vendors.

Accordingly, in one embodiment there is provided a method performed by an application handling function (AHF) of a mobile core network. The method includes receiving a query message transmitted by an application server function (ASF), the query message comprising a first subscriber identifier for identifying a first subscriber. The method also includes using the first subscriber identifier to obtain a first user equipment (UE) profile associated with the first subscriber identifier. The method further includes transmitting towards the ASF a query response message responsive to the query message, the query response message comprising the first UE profile. The first UE profile comprises i) a first UE identifier (ID) for a first UE of a first UE type and ii) a first command ID that identifies a first command that the ASF is authorized to invoke with respect to the first UE in connection with providing a service to the first subscriber.

In another aspect there is provided a method performed by an application server function (ASF) providing a service to subscribers. The method includes receiving an application request message comprising a first subscriber identifier associated with a first subscriber. The method also includes transmitting to an application handling function (AHF) of a mobile core network a query message comprising the first subscriber identifier, the query message for causing the AHF to use the first subscriber identifier to obtain a first UE profile associated with the first subscriber identifier. The method also includes receiving a query response message responsive to the query message, wherein the query response message comprises the first UE profile and was transmitted by the AHF. The first UE profile comprises i) a first UE identifier for a first UE of a first UE type and ii) a first command identifier that identifies a first command that the ASF is authorized to invoke with respect to the first UE in connection with providing a service to the first subscriber.

In another aspect there is provided a computer program comprising instructions which when executed by processing circuitry of a network node causes the network node to perform any one of the methods disclosed herein. In another aspect there is provided a carrier containing the computer program, wherein the carrier is one of an electronic signal, an optical signal, a radio signal, and a computer readable storage medium.

In another aspect there is provided a network node, where the network node is configured to perform any one of the methods disclosed herein. In some embodiments, the network node includes processing circuitry and a memory containing instructions executable by the processing circuitry, whereby the network node is configured to perform any one of the methods disclosed herein.

An advantage of the embodiments disclosed herein is that they enable the decoupling of SW applications from hardware (HW) devices, thereby enabling that applications can be designed making use of existing HW devices already owned by MNO subscribers. This will simplify and boost the design of new SW defined applications. Moreover, applications can become smarter since they can discover and use UEs owned or rented by a MNO subscriber. It will become possible to design an application that makes use all IoT devices owned by a user even though they are of different types, from different vendors, and belong to different environments (e.g., wearable devices, healthcare, Internet of Sense, Smart Home, Smart City, Automotive, etc.). An MNO that implements an embodiment in its network is not only able to provide bandwidth to an over-the-top (OTT) application provider, but also is able to deliver value added services. The possibility to mix different user needs and UE capabilities from diverse vertical sectors will allow an MNO to create hundreds of different combinations unlocking new smart and comprehensive applications. For some embodiments, additional advantages include increased security and traceability of malicious use of devices as some embodiments require that each UE registered in the network must be assigned to at least one subscriber in order to be active sending data and receiving commands. Additionally, some embodiments enable anonymization of user data and UE transactions thereby providing secure access to personal devices by $3^{rd}$ party applications. That is, in some embodiments, and application will only have access to an encrypted identity of user and devices and all the personal and devices sensitive information shall remain within the MNO.

BRIEF DESCRIPTION OF THE DRAWINGS

The accompanying drawings, which are incorporated herein and form part of the specification, illustrate various embodiments.

DETAILED DESCRIPTION

As described above, certain challenges presently exist including that, with the convention core network design, it will be difficult to create smart applications making use of diverse types of UEs in different contexts and from different vendors. For example, imagine a hypothetical application dedicated to wine drinkers that classifies the wine quality using an "electronic nose" IoT UE and a chromatic sensor. The same application could be configured to monitor the health state of the wine drinker by communicating with the drinker's wearable UE (e.g. smart watch that provides information about blood oxygen levels, blood pressure, and hearth pulses) and alert the drinker that the drinker is likely impaired. Depending on the level of impairment, the same application could communicate with a controller in the drinker's car to disable the car and, thereby, prevent the drinker from driving drunk.

With the IoT framework that exists today such a hypothetical application will be impossible or difficult to create because the application SW should be sold with the IoT or IoS devices (e-nose, chromatic-sensor, wearable device, and car device) and the cost would be extremely high. As an alternative, the application SW vendor should make agreements to each UE vendor to use the UE and access their interface. This approach is also unacceptable from security and privacy point of view since personal user data and sensitive UEs (like cars) would be exposed to third party applications. In short, today each UE is handled by an application in its own vertical sector and only the application is aware of the user/owner of the UE itself. There is no function in the network able to keep track of the user/owner of a certain UE in the network. This disclosure aims to overcome these issues.

Figure 1:
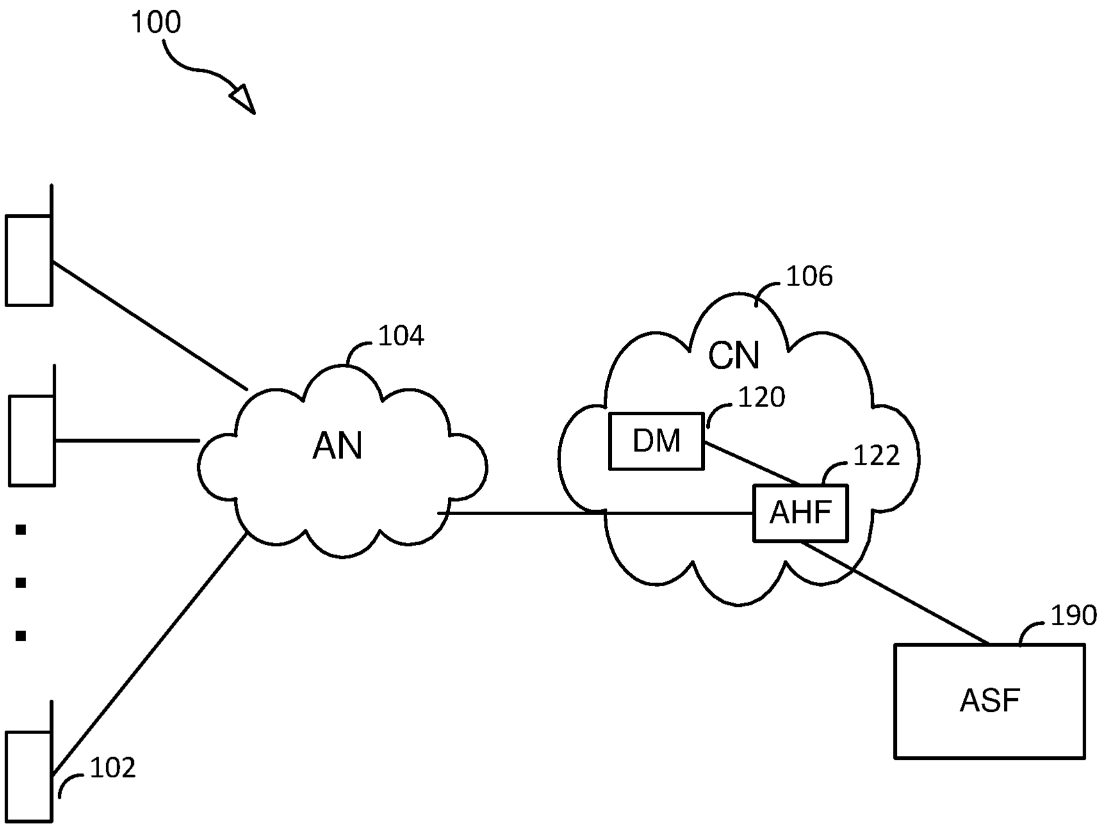
FIG. 1 illustrates an exemplifying communication system.

FIG. 1 illustrates a communication system 100, according to an embodiment, that enables any number of user equipments (UEs) (e.g., UE 102) to communicate with an application server function (ASF) 190 via an access network 104 (e.g., a radio access network (RAN) comprising one or more base stations) and a core network (CN) 106 operated by or for an MNO. As used herein, a UE is any communication UE (mobile or fixed) (e.g., mobile phone, sensor, controller, appliance, vehicle, tablet, laptop, residential gateway, IoT device, IoS, device, etc.) that is capable of communicating with the access network 104.

In the embodiment shown, CN 106 includes a data manager (DM) 120 and an application handling function (AHF) 122. DM 120 stores subscriber information. With respect to a 5G core network, DM 120 may correspond to the User Data Manager (UDM). In some embodiments, AHF 122 keeps track of the UEs (e.g., IoT devices) associated to each MNO subscriber (permanently or temporary owned by a subscriber).

Figure 2:
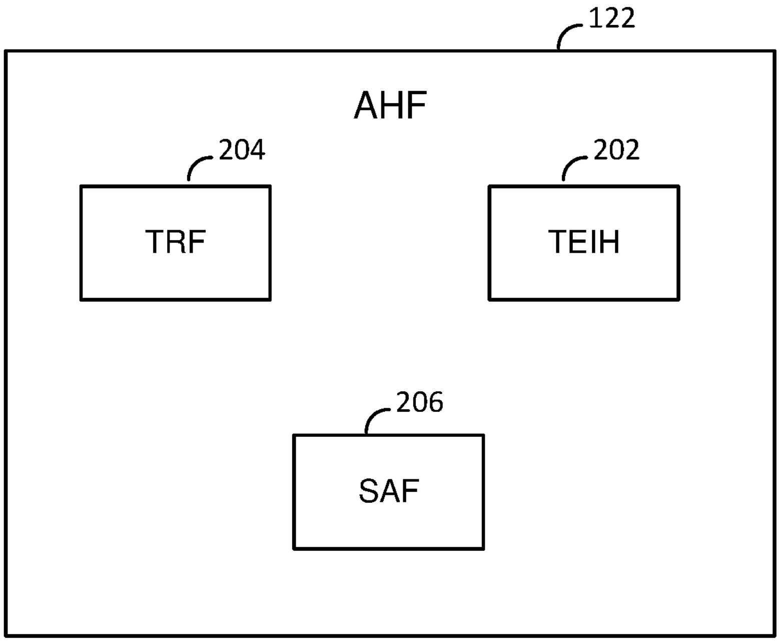
FIG. 2 illustrates components of an application handling function according to some embodiments.

FIG. 2 illustrates components of AHF 122 according to some embodiments. As shown in FIG. 2, AHF 122 may include: a Things Exposure Interface (TEI) Handler (TEIH) 202; a Things Repository Function (TRF) 204; and a Security Anonymization Function (SAF) 206. The SAF handles anonymization of transactions and related key handling.

Any ASF will be enabled to interact with UEs through a TEI exposed by TEIH 202, and will be aware of the UEs owned by the subscriber requiring its service. This mechanism will enable the creation of smart SW application for subscribers based on a mix of multi-vendor UEs of different, not homogeneous type.

In some embodiments, AHF 122 is part of a 5G or 6G core network (in the full network or in a dedicated network slice) where the data, management & control (and billing) are fully in the domain of MNO.

In some embodiments, a UE can be associated with one or more subscribers at the same time (e.g., a home appliance can be associated to each person living in the home, a car to the mother and father who both drive it, a webcam is associated to the company where the mother works and run video conferences while each member of the family owns a wearable device).

The deployment of AHF 122 component in the MNO core network gives the possibility to maintain an association between the UE and who is using it. The subscriber using the UE is authenticated and identified by its SIM and its data in a DM. This gives several advantages in terms of security and open to new business case within MNO network.

With respect to security, a possible use case is that a UE will not be allowed to enter an active state until it is associated with a subscriber. This enhances security and control for potentially dangerous UEs (e.g., a drone that could be used for a nefarious purpose). The MNO can keep track of who is using what UE and when, and the data will be maintained and secured by the MNO.

With respect to a new business case, the MNO can make available a pool of costly UEs with a pay-per-use model to their subscribers. For instance, an MNO may generate revenue by renting IoT devices or offering the rent service to third parties.

In some embodiments, the MNO can expose to ASF 190 an interface using already existing technology, such as, for example, Lightweight Machine2Machine (LwM2M), Semantic Definition Format (SDF) where ASF 190 can interact with UEs associated with the MNO subscriber requesting the service.

The embodiments also enable new use cases, like filtering. In a filtering use case, AHF 122 may expose to ASF 190 only a subset of the functions of an IoT device and/or a subset of subscriber data. For example, AHF 122 may expose only the UE type (e.g., e-nose) and a limited set of functions that ASF 190 is allowed to invoke (e.g., command sniff and get smell result), but shall filter the specific UE brand or additional features (e.g., e-nose is also able to give alarm in case of smoke smell, but ASF 190 is not allowed to use this feature).

Subscriber details and data can be optionally pseudonymized and encrypted by the MNO. For example, ASF 190 will only be provided with an encrypted ID of the subscriber and selected data of the associated UE, while the subscriber data and the detailed data of UE are known only by MNO.

Subscribers may be authenticated and identified in the 5G/6G network by, for example, their SIM or eSIM and associated data in the UDM.

One subscriber can own/use several UEs. Similarly, a UE can be owned or rented by one or more subscribers. In some embodiments, UE ownership information is stored in the TRF. The TRF has the logic to handle the ASF requests towards the UEs and to forward the UE data towards the correct ASF. In case encryption is used, TRF will maintain the association between a UE ID (UID) (e.g., MAC address, International Mobile Equipment Identity (IMEI) or other UE identifier) and UE encrypted ID. TRF shall also be able to store the capabilities of new UE types when they register themselves in the network.

In some embodiments, the information identifying the subset of UE capabilities (filtering) that ASF 190 is allowed to use for a specific subscriber and specific type of UE is stored in the TEIH 202. The TEIH exposes this information to ASF 190 via the TEI. In some embodiments, TEIH may store the allowed capabilities of each UE per session. In some embodiments, for each UE a subscriber owns or rents, the subscriber will have the ability to authorize or not the use of capabilities of the subscriber's UE. That is, for each such UE, the subscriber will have the ability to specify which of the commands the UE supports ASF 190 is authorized to invoke.

In some embodiments, before ASF 190 can send commands to a subscriber's UE an initialize phase and a subscription phase are needed.

In the initialization phase, a new UE type is announced. After the UE type is announced, a UE of that UE type may be registered in AHF 122. When the UE is registered metadata regarding the UE is stored in DM 120 and the DM communicates to the TRF a UID associated with the UE and a UE type ID indicating the UE's type.

After the UE is registered, a subscriber may buy or rent the UE. When the subscriber buys or rents the UE, the TRF will store information associating the UID a subscriber ID for the subscriber.

Figure 3:
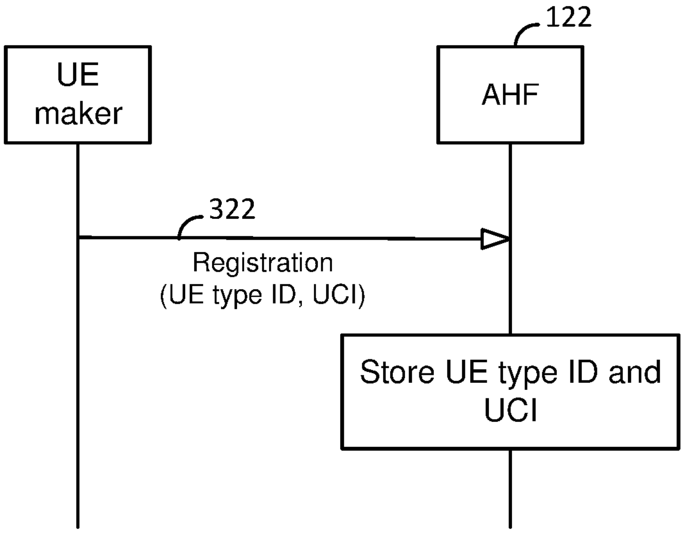
FIG. 3 is a message flow diagram illustrating a message flow according to an embodiment.

After the subscriber buys/rents the UE, the subscriber may request ASF 190 to provide a specific service (application) to the subscriber. ASF 190 will then send to AHF 122 a query message comprising one or more UE type IDs, where each UE type ID identifies a type of UE that ASF 190 requires the user to have in order for ASF 190 to provide its service to the subscriber. ASF 190 and the subscriber will handshake UE profile through TEIH and TRF. If ASF 190 is authorized to provide the service to the subscriber, ASF 190 will receive back the IDs of the UEs and methods to use via an UE profile. Optionally the UIDs could be anonymized, and a set of keys will be communicated instead of the real ones. ASF 190 can now perform its task getting data and sending authorized commands to the subscriber's UEs. All the transactions can be anonymized to protect the data from possible leakage FIG. 3 is a message flow diagram illustrating the initialization phase according to some embodiments. As shown in FIG. 3, a UE manufacturer or distributer ("UE maker") sends to AHF 122 a registration message 322 to register a new UE type. The registration message comprises a UE type ID that identifies the new UE type and a UE capability information (UCI) comprising capability information indicating the commands that UEs of the UE type will support. That is, for example, the UCI may comprise one or more command identifiers (CIDs), where each CID identifies a command that UEs of the UE type support. For example, if the UE type is "temperature sensor," then the UCI may indicate that any UE of this UE type supports a "report current temperature" command. In response to receiving registration message 322, AHF 122 stores the UE type ID and UCI in a database so that the UCI is associated with the UE type ID. Table 1 illustrates an example of UCI that may be included in message 322.

TABLE 1

{
"@context": "dtmi:dtdl:context;2",
"@type": "Interface",
"displayName": "Thermostat",
"description": "Reports current temperature and provides TABLE 1-continued

```
desired temperature control.",
 "contents": [
 Public double get_temperature (...);
 Public void increase_temperature (...);
 Public void decrease_temperature (...);
       // ...
      ]
}
```

As shown in Table 1, UE of the UE type "thermostat" support the following commands: get_temperature; increase_temperature; decrease_temperature.

Figure 4:
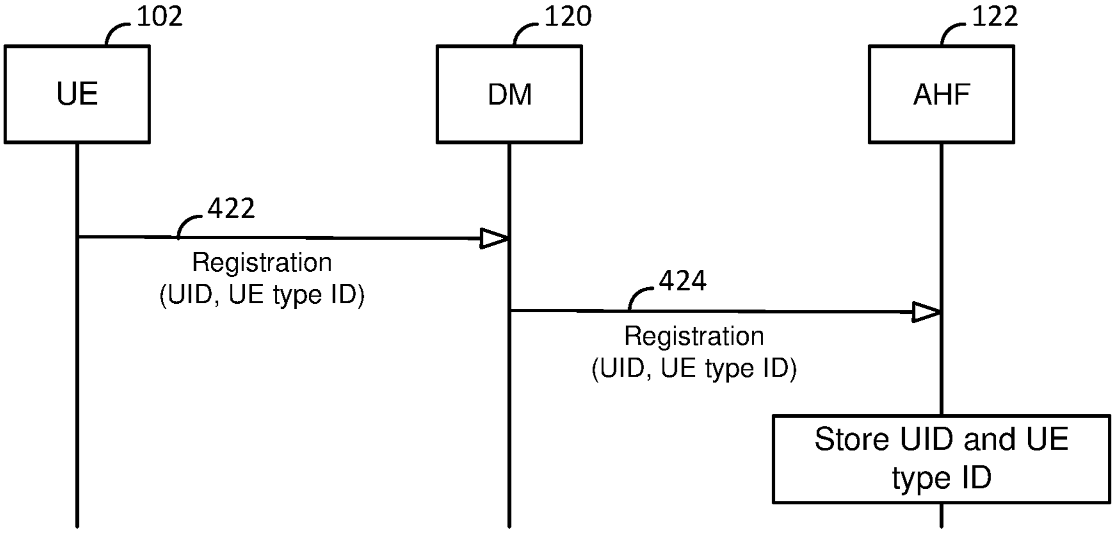
FIG. 4 is a message flow diagram illustrating a message flow according to an embodiment.

FIG. 4 is a message flow diagram illustrating UE 102 being registered with AHF 122 according to some embodiments. The UE sends to DM 120 (e.g., a UDM) a registration message 422 which contains a UID for identifying the UE and a UE type ID identifying the type of the UE (message 422 may also contain the UCI indicating capabilities of the UE). The DM then sends to AHF 122 a registration message 424 which contains the UID (or an encrypted version of the UID (Enc(UID))) and the UE type ID (and the UCI if included in message 422). AHF 122 then stores in a database a record comprising the UID/Enc(UID) and the UE type ID and the UCI (either obtained from message 424 or message 422), thereby linking the UID/Enc(UID) with the UE type ID and UCI.

Figure 5:
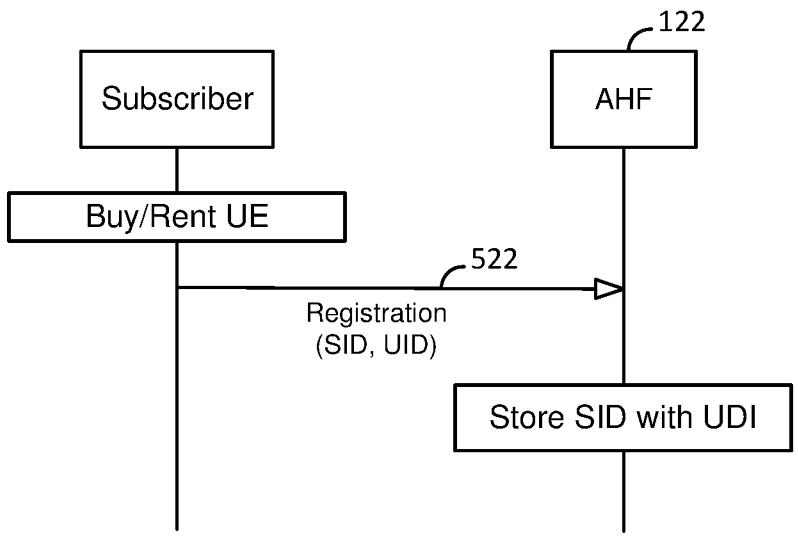
FIG. 5 is a message flow diagram illustrating a message flow according to an embodiment.

When a subscriber acquires the UE (e.g., buys or rents the UE), the subscriber may inform AHF 122. This is illustrated in the message flow diagram shown in FIG. 5. As shown in FIG. 5, the subscriber sends to AHF 122 a registration message 522 that contains a subscriber ID (SID) for the subscriber (e.g., username, email address, etc.) and the UID for the UE. AHF 122 then stores in a database the SID in association with the UID, thereby linking the UID with the SID. For example, AHF 122 may store in the database a record comprising the SID and the UID (the record may also contain the UE type ID). Additionally/Alternatively, AHF 122 may add the SID to a list of SIDs already associated with the UID, where each SID in the list identifies a subscriber that use the UE (e.g., the UE may be an automobile that is used by both a husband and wife).

Figure 6:
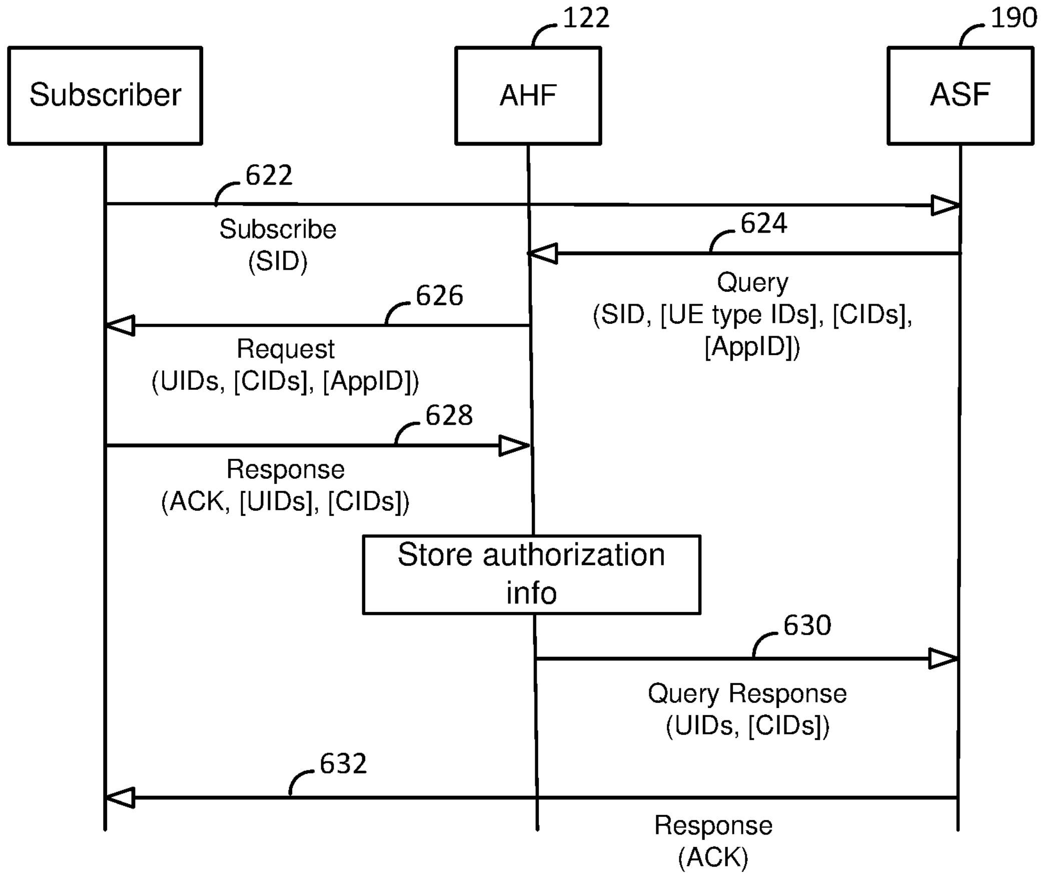
FIG. 6 is a message flow diagram illustrating a message flow according to an embodiment.

After the subscriber registers the subscriber's UE, the subscriber may subscribe to a service provided by ASF 190. This step is shown in the message flow diagram shown in FIG. 6. More specifically, as shown in FIG. 6, the subscriber transmits to ASF 190 a subscribe message 622 (a.k.a., "application request message") comprising the subscriber's SID (the subscribe message 622 may further contain an application ID (AppID) (e.g., AppID=A-123) to identify the service (a.k.a., application) that the subscriber desires to obtain).

After receiving the subscribe message 622, ASF 190 transmits to AHF 122 a query message 624 comprising the subscriber's SID. Query message 624 may also contain a set of one or more UE type IDs. Each one of these UE type IDs identifies a type of UE that the subscriber must have to enable ASF 190 to provide the requested service to the subscriber. Additionally, in some embodiments, for one or more of the UE type IDs included in query message 624, query message 624 may further comprise a corresponding set of one more command IDs (CIDs), each CID identifying a command for which ASF 190 seeks authorization to invoke to provide the service to the subscriber. In some embodiments, query message also includes an AppID identifying the service to which the subscriber is subscribing (e.g., AppID=A-123).

After receiving query message 624, AHF 122 determines whether ASF 190 is able to provide the service to the subscriber. For example, assuming query message 624 includes the set of UE type IDs, AHF 122 determines, for each UE type ID included in query message 624, whether the subscriber identified by the SID included in message 624 has authorized access to (e.g., owns or rents or leases) a UE of the identified UE type. If, for any one of the UE type IDs, the subscriber is not in possession of a UE of that UE type, then the ASF is not able to provide the service to the subscriber because the subscriber does not have all of the necessary UEs.

Assuming the ASF is able to provide the service to the subscriber (i.e., the subscriber is in possession of the necessary UEs), then AHF 122 uses data stored in its database to retrieve the corresponding UIDs. For example, assume that message 624 contains the following UE type IDs: type-A and type-B; AHF 122 has in its database a subscriber record for the subscriber indicating that the subscriber has a first UE of type-A and a second UE of type-B and the subscriber record contains a UID for the first UE (e.g., UE-123) and contains a UID for the second UE (e.g., UE-345).

After obtaining the UIDs, AHF 122 transmits to the subscriber a message 626 comprising the obtained UIDs (message 626 may also contain the AppID) and requesting an acknowledgement from the subscriber that the subscriber authorizes the ASF to provide the service to the subscriber using the UEs identified by the UIDs included in the message. If message 624 included CIDs, then message 626 may also include the command IDs so that the subscriber can see which commands ASF 190 wants to be authorized to invoke on the corresponding UE.

After receiving message 626, the subscriber transmits to AHF 122 a response message 628. Response message contains information to indicate the UEs that the subscriber will allow the ASF to access (i.e., send commands to). For example, response message 628 may contain one or more of the UIDs that were included in message 626 to indicate the UEs that the subscriber will allow the ASF to access.

For example, UE-123 may be a watch and UE-345 may be a mobile phone. If the subscriber authorizes the ASF to access both the watch and the mobile phone, then both UIDs are included in message 628. But if the subscriber only authorizes the ASF to access the watch, then message 628 will include UID UE-123, but will not include UID UE-345.

Additionally, if a UID is included in response message 628, response message 628 may also include a corresponding list of one or more CIDs for the UID. This corresponding list of CIDs identifies the commands that the subscriber has authorized for ASF 190.

For example, if the watch has a temperature sensor that can provide temperature readings and a heart monitor that can provide pulse rate readings, the user may only want to authorize ASF 190 to request temperature readings but not pulse rate readings. Hence, in this scenario, the list of commands associated with UID UE-123 (the subscriber's watch) will identify the command for obtaining temperature readings from the watch, but will not identify the command for obtaining pulse rate readings from the watch.

After receiving response message 628, AHF 122 stores the information contained in the message. Table 2 below illustrates an example of the information that is stored:

TABLE 2

| | | |
|---|---|---|
| AppID = A-123 | UID = UE-123 | CID List = C1, C2 |
| | UID = UE-345 | CID List = C7 |

The information in Table 2 indicates that the service identified by AppID=A-123 is authorized to invoke commands C1 and C2 with respect to UE-123 (the subscriber's watch) and is authorized to invoke command C7 with respect to UE-345 (the subscriber mobile phone). Additionally, after receiving response message 628, AHF 122 transmits to ASF 190 a query response message 630 indicating the subscriber's UEs that ASF 190 is authorized to interact with and indicating the commands that ASF 190 may invoke with respect to those UEs. That is, for each such subscriber UE that ASF 190 is authorized to interact with, message 630 comprise a UE profile that contains a UID and a corresponding set of one more CIDs. For example, query response message may comprise the information shown in table 3:

TABLE 3

| | |
|---|---|
| UID = UE-123 or Encrypt(UE-123) | CID List = C1, C2 |
| UID = UE-345 or Encrypt(UE-345) | CID List = C7 |

As shown in Table 3, the query response message may comprise the actual UIDs or an encrypted version of the UID to protect the subscriber's privacy.

After receiving query response message 630, ASF 190 transmits to the subscriber a subscribe response message 632 to positively acknowledge the subscribe message 622.

Figure 7:
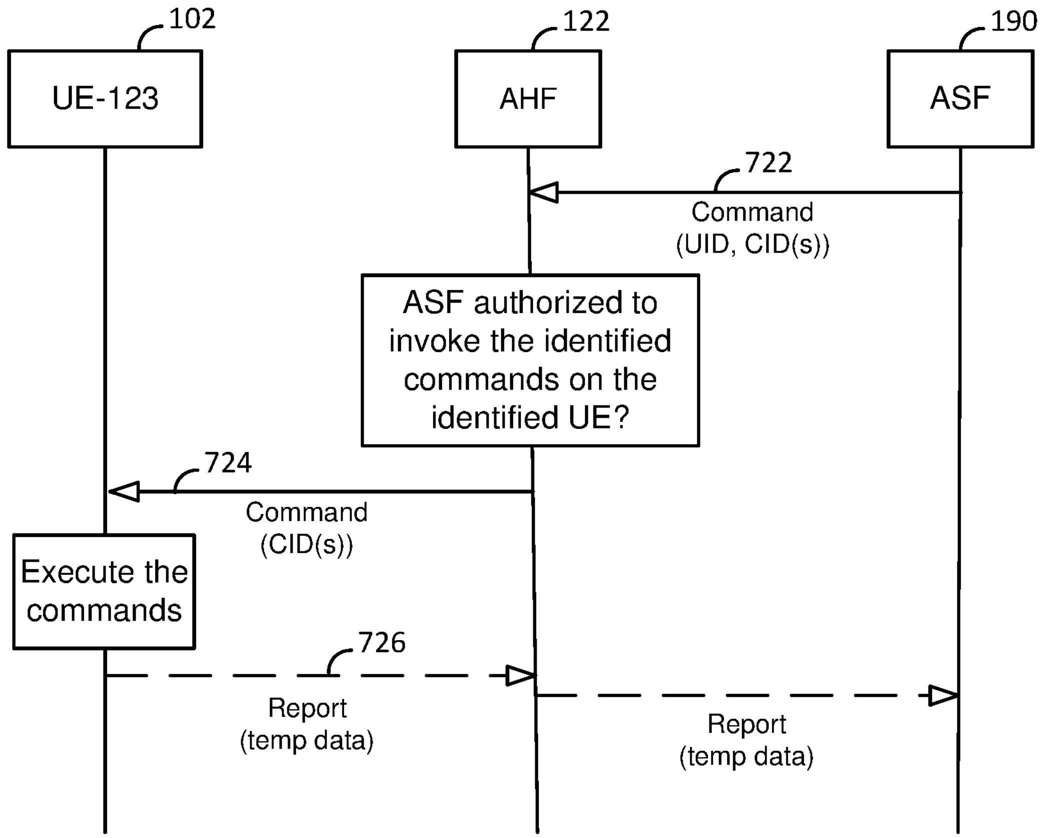
FIG. 7 is a message flow diagram illustrating a message flow according to an embodiment.

FIG. 7 is a message flow diagram, according to some embodiments, illustrating how ASF 190 is able to invoke one or more commands on UE-123 (e.g., UE 102 shown in FIG. 1). As shown in FIG. 7, ASF 190 transmits to AHF 122 a command message 722 that comprises: i) a UID=UE-123 or Encrypt(UE-123) (i.e., the UID that identifies the UE or the encrypted version of the UID) and ii) a set of one or more command IDs corresponding to the one or more commands.

After receiving command message 722, AHF 122 determines whether ASF 190 is authorized to invoke the identified command(s) on the UE identified by the UID. For example, using an ID associated with ASF 190 (e.g., AppID=A-123), which ID may be included in command message 722, AHF 122 can retrieve authorization information from a database (e.g., see Table 2 as an example of the authorization information) and determine whether the authorization indicates that ASF 190 is authorized to invoke the command(s) on UE-123. For example, if message 722 included CID C2, then, because C2 is in the list of CIDs for UE-123 as shown in Table 2, AHF 122 determines that ASF 190 is authorized (but if C2 was not in the list, then ASF 190 would not be authorized). After determining that ASF 190 is authorized to invoke the identified command(s) on UE-123, AHF 122 transmits to UE-123 a command message 724 for invoking the command(s) on UE-123. That is, command message 724 may contain the CIDs that were included in message 722.

After receiving command message 724, UE-123 executes the identified command(s). For example, if one of the commands is for UE-123 to provide an alert the subscriber, then UE-123 provides the alert. As another example, if one of the commands is for UE-123 to provide a temperature reading, then UE-123 uses its temperature sensor to obtain the temperature reading and then transmits a report message 726 containing the temperature data to AHF 122, which then forwards the report message to ASF 190.

Figure 8:
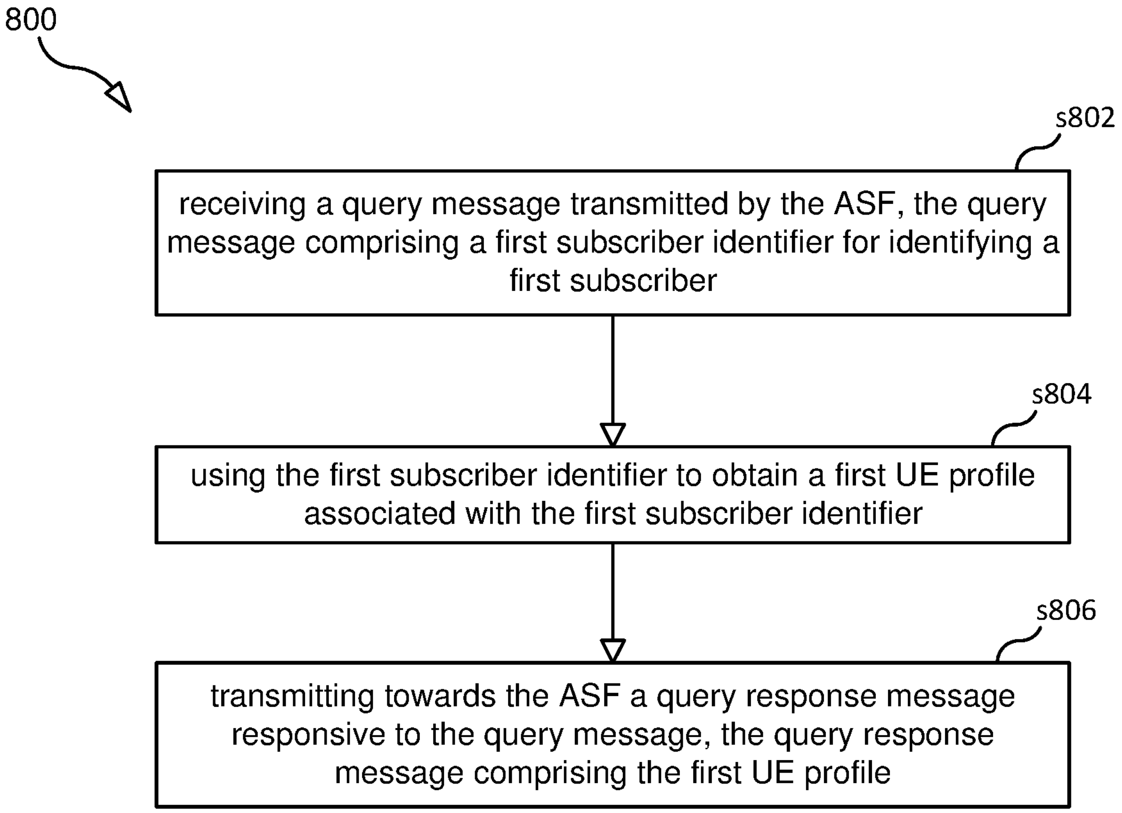
FIG. 8 is a flowchart illustrating a process according to an embodiment.

FIG. 8 is flowchart illustrating a process 800 according to some embodiments. Process 800 is performed by AHF 122 and may begin in step s802.

Step s802 comprises receiving a query message transmitted by ASF 190, the query message comprising a first subscriber identifier for identifying a first subscriber.

Step s804 comprises using the first subscriber identifier to obtain a first UE profile associated with the first subscriber identifier. For example, step s804 comprises AHF 122 using the subscriber identifier to transmit to the subscriber a request message (e.g., message 626), which causes subscriber to transmit to AHF 122 a response message (e.g., message 628) that comprises the first UE profile (e.g., a UID and a corresponding set of CIDs).

Step s806 comprises transmitting towards ASF 190 a query response message responsive to the query message, the query response message comprising the first UE profile. The first UE profile comprises i) a first UID for a first UE of a first UE type and ii) a first command ID that identifies a first command that ASF 190 is authorized to invoke with respect to the first UE in connection with providing a service to the first subscriber.

In some embodiments, the query message further comprises a first UE type identifier identifying the first UE type, and both the first subscriber identifier and the first UE type identifier are used to retrieve the first UE profile. In some embodiments, the query message further comprises a second UE type identifier, the first UE type identifier identifies a UE type manufactured by a first UE manufacturer, and the second UE type identifier identifies a UE type manufactured by a second UE manufacturer.

In some embodiments the process further includes using the first subscriber identifier and the second UE type identifier to retrieve a second UE profile associated with the first subscriber identifier and the second UE type identifier, wherein the query response message further comprises the second UE profile, and the second UE profile comprises i) a second UE identifier for a second UE of the second UE type and ii) a command identifier identifying a command that ASF 190 is authorized to invoke with respect to the second UE in connection with providing a service to the first subscriber.

In some embodiments, the query message further comprises a first set of one or more command identifiers associated with the first UE type identifier, the first set of one or more command identifiers comprising the first command. In some embodiments, the first set of one or more command identifiers further comprises a second command identifier, and the first UE profile indicates that ASF 190 is not authorized to invoke the second command with respect to the first device.

In some embodiments the process further includes receiving a command message transmitted by ASF 190, the command message comprising the first UE identifier identifying the first UE and the first command identifier identifying the first command. In some embodiments, the command message further comprises the first subscriber identifier, and the process further comprises: after receiving the command message, determining whether ASF 190 is authorized by the first subscriber to invoke the first command with respect to the first device; and after determining that ASF 190 is authorized by the first subscriber to invoke the first command with respect to the first device, transmitting towards the first UE a second command message comprising the command identifier. In some embodiments the process further includes receiving a first command response message responsive to the second command message, wherein the first command response message comprises data retrieved or generated by the first device; and transmitting towards ASF 190 a second command response message comprising said data.

In some embodiments, determining whether ASF 190 is authorized to invoke the first command with respect to the first UE comprises: retrieving authorization information using an application identifier associated with ASF 190 and the first subscriber identifier, wherein the authorization information indicates whether or not ASF 190 is authorized to invoke the first command with respect to the first device.

In some embodiments, the first UE identifier is an encrypted version of a UE identifier for identifying the first device.

In some embodiments the process further includes, prior to receiving the query message, receiving a registration message transmitted by an owner of the first device, the registration message comprising the first UE type identifier and the first UE identifier; and, after receiving the registration message, storing a record comprising the first UE type identifier and the first UE identifier.

In some embodiments, the first subscriber identifier is linked with the first UE identifier, and a second subscriber identifier for identifying a second user is also linked with the first UE identifier.

In some embodiments the process also includes receiving a second query message transmitted by ASF 190, the second query message comprising the second subscriber identifier; using the second subscriber identifier to obtain a second UE profile associated with the second subscriber identifier; and transmitting towards ASF 190 a second query response message responsive to the second query message, the second query response message comprising the second UE profile, wherein the second UE profile comprises i) the first UE identifier for the first UE of the first UE type and ii) a command identifier that identifies a command that ASF 190 may invoke with respect to the first device.

Figure 9:
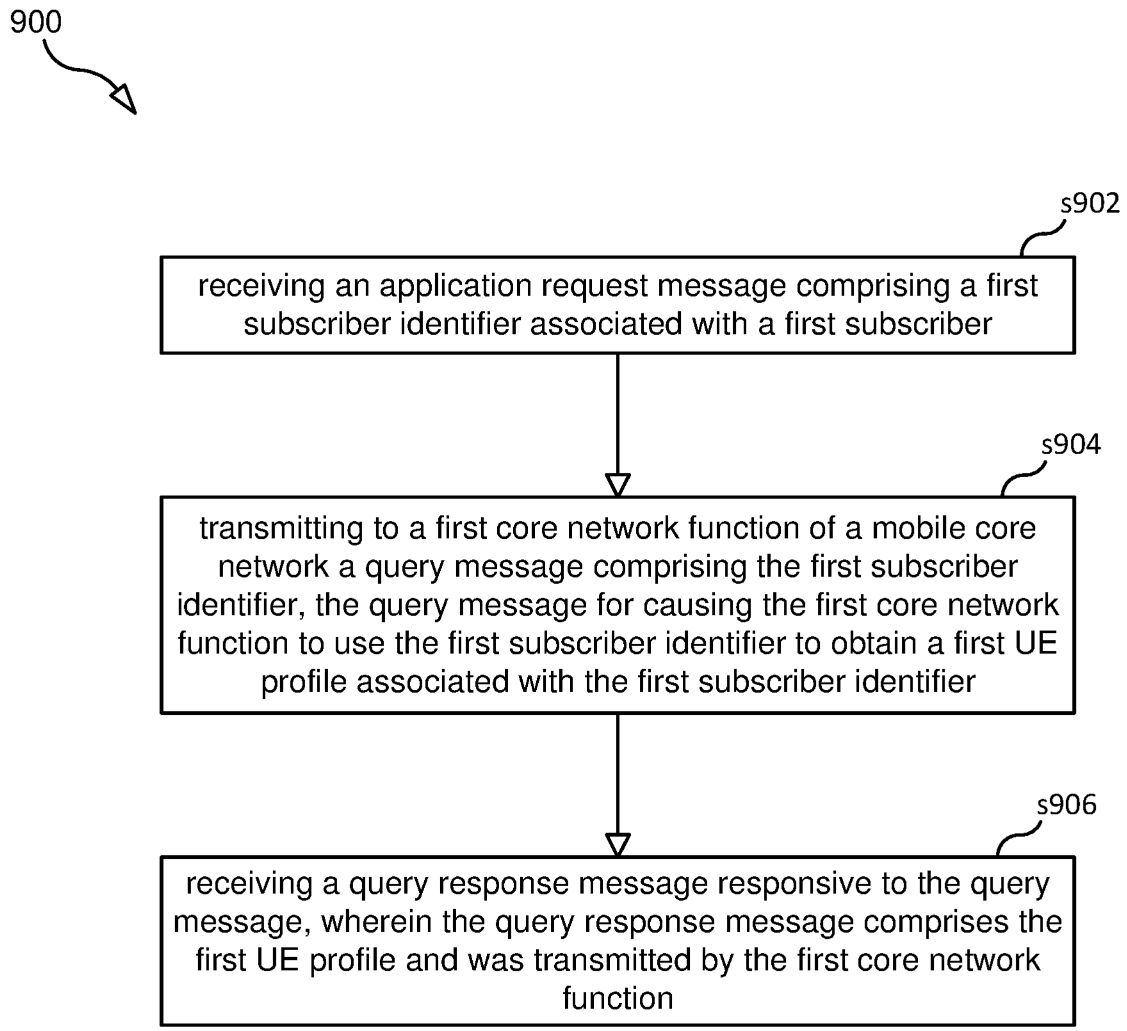
FIG. 9 is a flowchart illustrating a process according to an embodiment.

FIG. 9 is flowchart illustrating a process 900 according to some embodiments. Process 900 is performed by ASF 190 and may begin in step s902.

Step s902 comprises receiving an application request message (e.g., message 622) comprising a first subscriber identifier associated with a first subscriber.

Step s904 comprises transmitting to AHF 122 a query message (e.g., message 624) comprising the first subscriber identifier, the query message for causing the AHF to use the first subscriber identifier to obtain a first UE profile associated with the first subscriber identifier.

Step s906 comprises receiving a query response message responsive to the query message, wherein the query response message comprises the first UE profile and was transmitted by the AHF. The first UE profile comprises i) a first UE identifier for a first UE of a first UE type and ii) a first command identifier that identifies a first command that ASF 190 is authorized to invoke with respect to the first UE in connection with providing a service to the first subscriber.

In some embodiments, the query message further comprises the first UE type identifier and a second UE type identifier, the first UE type identifier identifies a UE type manufactured by a first UE manufacturer, and the second UE type identifier identifies a UE type manufactured by a second UE manufacturer. In some embodiments, the query message further causes the AHF to use the first subscriber identifier and the second UE type identifier to search for a second UE profile associated with the first subscriber identifier and the second UE type identifier, the query response message further comprises the second UE profile, wherein the second UE profile comprises a second UE identifier for a second UE of the second UE type, and the second UE profile further comprises information identifying at least one command that ASF 190 is authorized to invoke with respect to the second UE in connection with providing a service to the first subscriber.

In some embodiments, the query message further comprises a first set of one or more command identifiers associated with the first UE type identifier, the first set of one or more command identifiers comprising the first command. In some embodiments, the first set of one or more command identifiers further comprises a second command identifier, the first UE profile does not comprise the second command identifier, and ASF 190 determines that it is not authorized to invoke the second command with respect to the first UE as a result of determining that the first UE profile does not comprise the second command identifier.

In some embodiments the process further includes ASF 190 invoking the first command with respect to the first device. In some embodiments, invoking the first command with respect to the first UE comprises ASF 190 transmitting to the AHF or to a second core network function of the mobile core network a command message comprising the first UE identifier and the first command identifier. In some embodiments the process further includes receiving a command response message responsive to the command message, wherein the command response message comprises one or more of: i) data retrieved by the first device, ii) data generated by the first device, or iii) an acknowledgement of the command message.

In some embodiments, the first UE identifier is an encrypted version of a UE identifier for identifying the first device.

In some embodiments the application request message was transmitted by UE, and the process further comprises, in response to receiving the query response message, transmitting to the UE a confirmation message responsive to the application request message.

Figure 10:
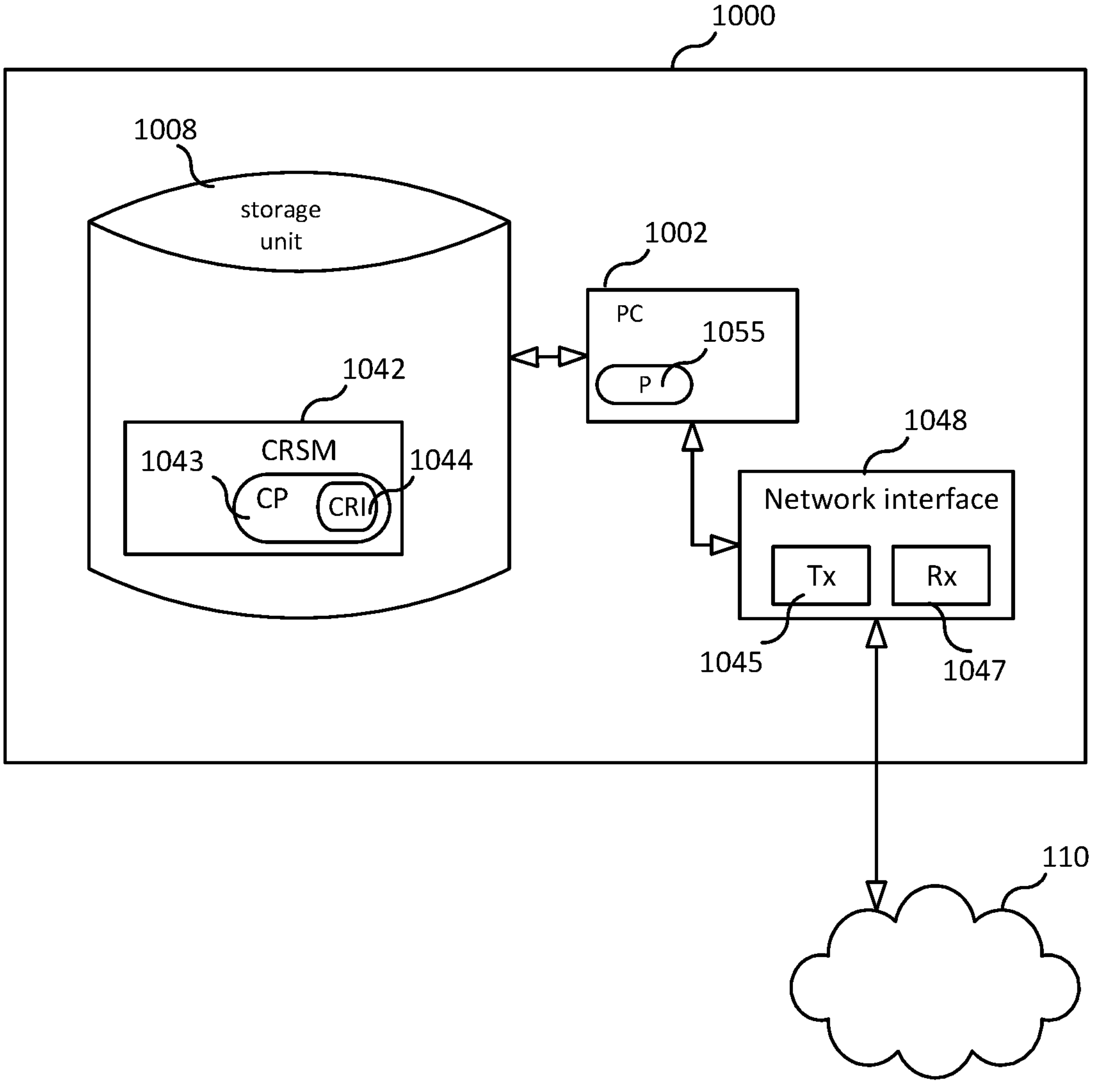
FIG. 10 illustrates a network node according to an embodiment.

FIG. 10 is a block diagram of network node 1000, according to some embodiments, which can be used to implement any of the network functions (NFs) disclosed herein (e.g., AHF, DM, ASF, etc.). For instance, in embodiments where an NF consists of software, network node 1000 may run the NF (or execute a virtual machine that runs the NF). As shown in FIG. 10, network node 1000 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., network node 1000 may be a distributed computing apparatus); at least one network interface 1048 (e.g., a physical interface or air interface) comprising a transmitter (Tx) 1045 and a receiver (Rx) 1047 for enabling network node 1000 to transmit data to and receive data from other nodes connected to a network 110 (e.g., an Internet Protocol (IP) network) to which network interface 1048 is connected (physically or wirelessly) (e.g., network interface 1048 may be coupled to an antenna arrangement comprising one or more antennas for enabling network node 1000 to wirelessly transmit/receive data); and a local storage unit (a.k.a., "data storage system") 1008, which may include one or more non-volatile storage devices and/or one or more volatile storage devices. In embodiments where PC 1002 includes a programmable processor, a computer readable storage medium (CRSM) 1042 may be provided. CRSM 1042 stores a computer program (CP) 1043 comprising computer readable instructions (CRI) 1044. CRSM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes network node 1000 to perform steps described herein (e.g., steps described herein with reference to the flow charts). In other embodiments, network node 1000 may be configured to perform steps described herein without the need for code. That is, for example, PC 1002 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by an application handling function (AHF) of a mobile core network, the method comprising:

receiving a query message transmitted by an application server function (ASF), the query message comprising a first subscriber identifier for identifying a first subscriber;

using the first subscriber identifier to obtain a first user equipment (UE) profile associated with the first subscriber identifier; and transmitting towards the ASF a query response message responsive to the query message, the query response message comprising the first UE profile, wherein the first UE profile comprises i) a first UE identifier (ID) for a first UE of a first UE type and ii) a first command ID that identifies a first command that the ASF is authorized to invoke with respect to the first UE in connection with providing a service to the first subscriber.

2. The method of claim 1, wherein the query message further comprises a first UE type identifier identifying the first UE type, and both the first subscriber identifier and the first UE type identifier are used to retrieve the first UE profile.

3. The method of claim 2, wherein the query message further comprises a second UE type identifier, the first UE type identifier identifies a UE type manufactured by a first UE manufacturer, and the second UE type identifier identifies a UE type manufactured by the first or a second UE manufacturer.

4. The method of claim 3, further comprising using the first subscriber identifier and the second UE type identifier to retrieve a second UE profile associated with the first subscriber identifier and the second UE type identifier, wherein the query response message further comprises the second UE profile, and the second UE profile comprises i) a second UE identifier for a second UE of the second UE type and ii) a command identifier identifying a command that the ASF is authorized to invoke with respect to the second UE in connection with providing a service to the first subscriber.

5. The method of claim 2, wherein the query message further comprises a first set of one or more command identifiers associated with the first UE type identifier, the first set of one or more command identifiers comprising the first command.

6. The method of claim 5, wherein the first set of one or more command identifiers further comprises a second command identifier, and the first UE profile indicates that the ASF is not authorized to invoke the second command with respect to the first device.

7. The method of claim 1, the method further comprising:

receiving a command message transmitted by the ASF, the command message comprising the first UE identifier identifying the first UE and the first command identifier identifying the first command, wherein the command message further comprises the first subscriber identifier;

after receiving the command message, determining whether the ASF is authorized by the first subscriber to invoke the first command with respect to the first device; and after determining that the ASF is authorized by the first subscriber to invoke the first command with respect to the first device, transmitting towards the first UE a second command message comprising the command identifier.

8. The method of claim 7, further comprising:

receiving a first command response message responsive to the second command message, wherein the first command response message comprises data retrieved or generated by the first device; and transmitting towards the ASF a second command response message comprising said data.

9. The method of claim 7, wherein determining whether the ASF is authorized to invoke the first command with respect to the first UE comprises:

retrieving authorization information using an application identifier associated with the ASF and the first subscriber identifier, wherein the authorization information indicates whether or not the ASF is authorized to invoke the first command with respect to the first device.

10. A method performed by an application server function (ASF) providing a service to subscribers, the method comprising:

receiving an application request message comprising a first subscriber identifier associated with a first subscriber;

transmitting to an application handling function (AHF) of a mobile core network a query message comprising the first subscriber identifier, the query message for causing the AHF to use the first subscriber identifier to obtain a first user equipment, (UE) profile associated with the first subscriber identifier; and receiving a query response message responsive to the query message, wherein the query response message comprises the first UE profile and was transmitted by the AHF, wherein the first UE profile comprises i) a first UE identifier for a first UE of a first UE type and ii) a first command identifier that identifies a first command that the ASF is authorized to invoke with respect to the first UE in connection with providing a service to the first subscriber.

11. The method of claim 10, wherein the query message further comprises the first UE type identifier and a second UE type identifier, the first UE type identifier identifies a UE type manufactured by a first UE manufacturer, and the second UE type identifier identifies a UE type manufactured by the first or a second UE manufacturer.

12. The method of claim 11, wherein the query message further causes the AHF to use the first subscriber identifier and the second UE type identifier to search for a second UE profile associated with the first subscriber identifier and the second UE type identifier, the query response message further comprises the second UE profile, the second UE profile comprises a second UE identifier for a second UE of the second UE type, and the second UE profile further comprises information identifying at least one command that the ASF is authorized to invoke with respect to the second UE in connection with providing a service to the first subscriber.

13. The method of claim 10, wherein the query message further comprises a first set of one or more command identifiers associated with the first UE type identifier, the first set of one or more command identifiers comprising the first command.

14. The method of claim 13, wherein the first set of one or more command identifiers further comprises a second command identifier, the first UE profile does not comprise the second command identifier, and the ASF determines that it is not authorized to invoke the second command with respect to the first UE as a result of determining that the first UE profile does not comprise the second command identifier.

15. The method of claim 10, further comprising the ASF invoking the first command with respect to the first device.

16. The method of claim 15, wherein invoking the first command with respect to the first UE comprises the ASF transmitting to the AHF or to a second core network function of the mobile core network a command message comprising the first UE identifier and the first command identifier.

17. A network node, the network node comprising:

processing circuitry; and memory containing instructions executable by the processing circuitry, wherein the network node is operative to:

receive a query message transmitted by an application server function (ASF), the query message comprising a first subscriber identifier for identifying a first subscriber;

use the first subscriber identifier to obtain a first user equipment, UE, profile associated with the first subscriber identifier; and transmit towards the ASF a query response message responsive to the query message, the query response message comprising the first UE profile, wherein the first UE profile comprises i) a first UE identifier (ID) for a first UE of a first UE type and ii) a first command ID that identifies a first command that the ASF is authorized to invoke with respect to the first UE in connection with providing a service to the first subscriber.

18. The network node of claim 17, wherein the query message further comprises a first UE type identifier identifying the first UE type, and both the first subscriber identifier and the first UE type identifier are used to retrieve the first UE profile.

19. A network node, the network node comprising:

processing circuitry; and memory containing instructions executable by the processing circuitry, wherein the network node is operative to:

receive an application request message comprising a first subscriber identifier associated with a first subscriber;

transmit to an application handling function (AHF) of a mobile core network a query message comprising the first subscriber identifier, the query message for causing the AHF to use the first subscriber identifier to obtain a first user equipment (UE) profile associated with the first subscriber identifier; and receive a query response message responsive to the query message, wherein the query response message comprises the first UE profile and was transmitted by the AHF, wherein the first UE profile comprises i) a first UE identifier for a first UE of a first UE type and ii) a first command identifier that identifies a first command that the network node is authorized to invoke with respect to the first UE in connection with providing a service to the first subscriber.

20. The method of claim 1, wherein using the first subscriber identifier to obtain the first UE profile comprises:

transmitting to the first subscriber a request message comprising the first UE ID and an authorization request, wherein the authorization request requests authorization from the first subscriber for the ASF to invoke the at least one command ID with respect to the first UE; and receiving from the first subscriber a response message indicating that the first subscriber authorizes the ASF to invoke the at least one command ID with respect to the first UE.

* * * * *